US012691776B2

(12) United States Patent
Wheatley

(10) Patent No.: US 12,691,776 B2
(45) Date of Patent: Jul. 28, 2026

(54) PORTABLE ELECTRIC VEHICLE (EV) CHARGING STATION CONFIGURED FOR REGULATORY PARKING COMPLIANCE

(71) Applicant: BEAM GLOBAL, San Diego, CA (US)

(72) Inventor: Desmond Wheatley, Rancho Santa Fe, CA (US)

(73) Assignee: BEAM GLOBAL, San Diego, CA (US)

( * ) Notice: Subject to any disclaimer, the term of this patent is extended or adjusted under 35 U.S.C. 154(b) by 0 days.

(21) Appl. No.: 18/412,494

(22) Filed: Jan. 13, 2024

(65) Prior Publication Data

US 2024/0149725 A1 May 9, 2024

Related U.S. Application Data

(63) Continuation of application No. 17/074,214, filed on Oct. 19, 2020, now abandoned.

(51) Int. Cl.
| | |
|---|---|
| *B60L 53/51* | (2019.01) |
| *H02S 20/32* | (2014.01) |
| *H02S 30/20* | (2014.01) |

(52) U.S. Cl.
CPC .............. *B60L 53/51* (2019.02); *H02S 20/32* (2014.12); *H02S 30/20* (2014.12)

(58) Field of Classification Search
None
See application file for complete search history.

(56) References Cited

U.S. PATENT DOCUMENTS

| | | | |
|---|---|---|---|
| 4,418,684 | A | 12/1983 | Sanders |
| 5,315,227 | A | 5/1994 | Pierson |
| 7,705,277 | B2 | 4/2010 | Noble |
| 8,648,551 | B2 | 2/2014 | Noble |
| 9,209,648 | B2 | 12/2015 | Wheatley |
| 9,917,471 | B2 | 3/2018 | Wheatley |
| 10,518,657 | B2 | 12/2019 | Wheatley |
| 2007/0024246 | A1 | 2/2007 | Flaugher |

(Continued)

FOREIGN PATENT DOCUMENTS

| | | |
|---|---|---|
| KR | 2006027784 A | 3/2006 |
| WO | 2011142683 A1 | 11/2011 |
| WO | 2012090191 A1 | 7/2012 |

*Primary Examiner* — Dustin Q Dam
(74) *Attorney, Agent, or Firm* — Pauley Erickson & Swanson

(57) ABSTRACT

A structure for supporting the solar array or other source of renewable energy for a portable electric vehicle charging station includes a base plate dimensioned for jurisdictional compliance with local space requirements for a parking lot and which can accommodate a vehicle parked on the base plate. When deployed, the solar array is positioned above the base plate. Structurally, the base plate is rectangular, with a length L and a width W. A central reinforcing bar is positioned on the base plate perpendicular to the ends and midway between the sides of the base plate. A lateral reinforcing bar extends midway between the ends and perpendicular to the sides of the base plate. Angled reinforcing bars can be added to extend between the central reinforcing bar and the lateral reinforcing bar at respective angles ±ψ. Reinforcing bars are configured to maximize bending reaction to wind loads on the solar array.

7 Claims, 3 Drawing Sheets

(56)  References Cited

U.S. PATENT DOCUMENTS

| | | | |
|---|---|---|---|
| 2007/0246095 A1 | 10/2007 | Schaefer | |
| 2008/0037243 A1 | 2/2008 | Discoe | |
| 2009/0050194 A1 | 2/2009 | Noble | |
| 2011/0055037 A1 | 3/2011 | Hayashigawa | |
| 2012/0279550 A1 | 11/2012 | Noble | |
| 2013/0037080 A1 | 2/2013 | Helfan | |
| 2013/0127395 A1 | 5/2013 | Santos Silva Serra Duarte | |
| 2013/0234645 A1 | 9/2013 | Goei | |
| 2013/0314037 A1 | 11/2013 | Caffy | |
| 2013/0342165 A1 | 12/2013 | Brimacombe | |
| 2014/0042956 A1* | 2/2014 | Wheatley | H02S 20/32 |
| | | | 320/101 |
| 2014/0193196 A1 | 7/2014 | Fournier | |
| 2014/0196387 A1 | 7/2014 | Neito | |
| 2015/0001201 A1* | 1/2015 | Adler | H02J 7/35 |
| | | | 320/101 |
| 2015/0288317 A1 | 10/2015 | Huang | |
| 2017/0021735 A1 | 1/2017 | Wheatley | |
| 2017/0174090 A1 | 6/2017 | Lakamp | |
| 2017/0324896 A1 | 11/2017 | Charabegian | |
| 2022/0118872 A1 | 4/2022 | Wheatley | |
| 2022/0274497 A1 | 9/2022 | Wheatley | |

* cited by examiner

PORTABLE ELECTRIC VEHICLE (EV) CHARGING STATION CONFIGURED FOR REGULATORY PARKING COMPLIANCE

REFERENCE TO RELATED APPLICATIONS

This application is a continuation-in-part of application Ser. No. 17/074,214 filed Oct. 19, 2020, which is currently pending. The contents of application Ser. No. 17/074,214 are incorporated herein by reference.

FIELD OF THE INVENTION

The present invention pertains generally to parking structures for recharging electric vehicles. More particularly, the present invention pertains to self-contained, portable, electric charging stations that can be erected at an individual parking space in a parking lot. The present invention is particularly, but not exclusively, useful as a recharging station that can be erected in a single parking space of a parking lot to accommodate and recharge an electric vehicle, without diminishing parking lot capacity, and without requiring any construction activity or any electrical set-up.

BACKGROUND OF THE INVENTION

In many urban and suburban environments, there is a recognized need for parking lots that have adequate parking spaces for passenger vehicles. Consequently, local jurisdictions frequently control parking lots with regulations that specify both the number and the size of parking spaces within a particular parking lot. Moreover, where electric vehicles are concerned, despite the advantage provided by the convenient availability of a charging station, there are typically no charging stations in [in remote or] older parking lots. Thus, while recognizing the need for regulatory compliance, it has also been recognized that the availability of electric charging stations in a parking lot is often desirable.

As can be easily appreciated, the installation of permanent electric charging stations in an existing parking lot can be expensive, disruptive and time consuming. More specifically, the requirement to obtain construction permits, the need to establish electrical connections with the local grid, and the future ability to accommodate an increased demand for electric vehicle charging stations are all cogent considerations. For these reasons, rather than updating preexisting parking lots to establish in ground, grid tied electric vehicle charging stations at preexisting parking lots, it may be more commercially desirable and preferable to position transportable, all-inclusive, electric vehicle charging infrastructure products that meet regulatory requirements. This possibility also provides an added degree of flexibility for the replacement and/or addition of charging stations.

With the above in mind, another consideration regarding the inclusion of an electric charging station within a preexisting parking space of a parking lot is the need to maintain the parking capacity of the parking lot. Stated differently, it is important that the erection of an electric charging station in an individual parking space of a preexisting parking lot does not diminish the availability of parking spaces in the lot. Moreover, because the electric charging station of the present invention is portable, it can be positioned and repositioned in a parking lot according to the operational needs of the particular parking lot.

In light of the above, it is an object of the present invention to provide a transportable electric charging station infrastructure product for charging electric vehicles that includes a base plate which is dimensioned to fit within the confines of a regulated parking space, while structurally supporting the solar array and/or light/wind generator that is being used as a source of electricity. Still another object of the present invention is to provide a portable charging station for electric vehicles that occupies a single parking space, in a parking lot, without encroaching on adjacent parking spaces or diminishing the capacity of the parking lot [by accommodating a parked vehicle at the vehicle charging infrastructure product]. Yet another object of the present invention is to provide a portable charging station for electric vehicles that can be installed in a parking lot quickly, efficiently, with no construction required, with no encroachment into adjacent spaces and with no disruption to the operation of the parking lot. Still another object of the present invention is to provide a portable charging station for electric vehicles that is easy to install, is simple to use, and is comparatively cost effective.

SUMMARY OF THE INVENTION

In accordance with the present invention, a base plate for supporting the solar array of a portable electric vehicle charging station is dimensioned for its placement at locations which may be subject to mandatory parking space requirements. For instance, a concern here is for urban parking lots where parking space dimension and quantity requirements are enforceable by locally enacted ordinances or regulations. Further, as envisioned for the present invention, in addition to being regulatory compliant the base plate is reinforced and can be oriented to operationally support the solar array by accounting for the sloping, tilting and/or other surface irregularities at the site where the charging station is to be located.

For purposes of the present invention, the base plate is rectangular and it has a peripheral edge with a length L and a width W. As noted above, the dimensions L and W are specifically established for compliance with jurisdictional parking space requirements and ease of transportability. Also, the base plate has a top surface and a bottom surface and defines a horizontal reference line on the top surface.

Operational components of the charging station that are supported on the base plate include a solar array having a plurality of solar panels with photovoltaic cells that convert solar energy into electricity. Also included is a column having an upper end and a lower end. In combination with the base plate, and the solar array, the lower end of the column is affixed onto the top surface of the base plate near its peripheral edge. This is done to position the upper end of the column at a predetermined height h above a predetermined area on the top surface of the base plate, and at a distance d from the lower end of the column. Preferably, the upper end of the column is positioned over a location near the center of the base plate, within the predetermined area. From this position, it is envisioned that the base plate can be sited within a predetermined parking space, and that the solar array can be operated without interfering with vehicles that may be parked on the portable electric vehicle charging station or in adjacent parking spaces. Specifically, operation of the solar panel is preferably accomplished using a device for continuously reorienting a solar panel as disclosed and claimed in U.S. Pat. No. 8,648,551.

Dimensionally, the base plate has a first end and a second end that are separated from each other by the distance L. It also has a first side and a second side, with each side extending between the first end and the second end of the base plate and separated from each other by the distance W.

Insofar as reinforcing of the base plate is concerned, several reinforcing bars can be embedded into the base plate, or otherwise mounted thereon. Specifically, if the base plate is cambered, it may be desirable to include reinforcing bars. If so, the reinforcing bars will typically include a central reinforcing bar that is positioned to extend through the center of the base plate between the first and second ends, and parallel to the first and second sides of the base plate. A lateral reinforcing bar can also be positioned to extend through the center of the base plate between the first and second sides, and perpendicular to the first and second sides of the base plate.

In addition to the central and lateral reinforcing bars, alternate embodiments may include a first pair of angled reinforcing bars can be included. If so, each angled reinforcing bar in the first pair should extend respectively from the center of the base plate toward the first end of the base plate at a respective angle $\pm\psi$ from the horizontal reference line on opposite sides of the horizontal reference line. Likewise, a second pair of angled reinforcing bars can be included to extend from the center of the base plate toward the second end of the base plate at a respective angle $\pm\psi$ from the horizontal reference line on opposite sides of the horizontal reference line.

It is to be appreciated that the reinforcing bars can be prearranged on the base plate as desired, or an arrangement of reinforcing bars can be customized for the particular site location of the charging station. In each case, the reinforcing bars are preferably oriented to maximize their bending reaction against prevailing wind loads on the charging station. Of particular importance here are the considerations to be given to wind, snow and seismic effects on the solar array and other equipment.

In addition to site conditions where the charging station is to be situated, construction of a base plate for the present invention must also address the various loading configurations on the base plate that will be imposed by operational movements of the solar array. For these considerations it is to be appreciated that the solar array will be moved (i.e. tracked) along a horizontal arc through an azimuthal angle $\theta$, and along a vertical arc through an elevation angle $\phi$ in accordance with a preprogrammed protocol. As noted above, movements of the solar array are preferably made in accordance with the operation of a device for continuously reorienting a solar panel disclosed in U.S. Pat. No. 8,648,551.

Operationally, a motorized unit is connected with a tracking mechanism for moving the solar array in accordance with the preprogrammed protocol. In accordance with this protocol the solar array can be moved through the angles $\theta$ and $\phi$ relative to the base angle $\theta$ base to maintain the solar array in an orientation wherein sunlight is always incident normal to the solar array.

As an auxiliary component, the charging station preferably includes a storage battery that is connected to the solar array for receiving electricity as it is generated by the solar array. In order to monitor and maintain the flow of electricity from the storage battery as it is dispensed to an electric vehicle, the present invention includes a control unit that is connected between the solar array and the storage battery. Also included is an emergency power panel which is connected to the control unit to allow a further dispensing of electricity from the storage battery when the availability of electricity from the grid does not exist due to a grid interruption or because the charging stations are located somewhere where there is no grid connection.

BRIEF DESCRIPTION OF DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
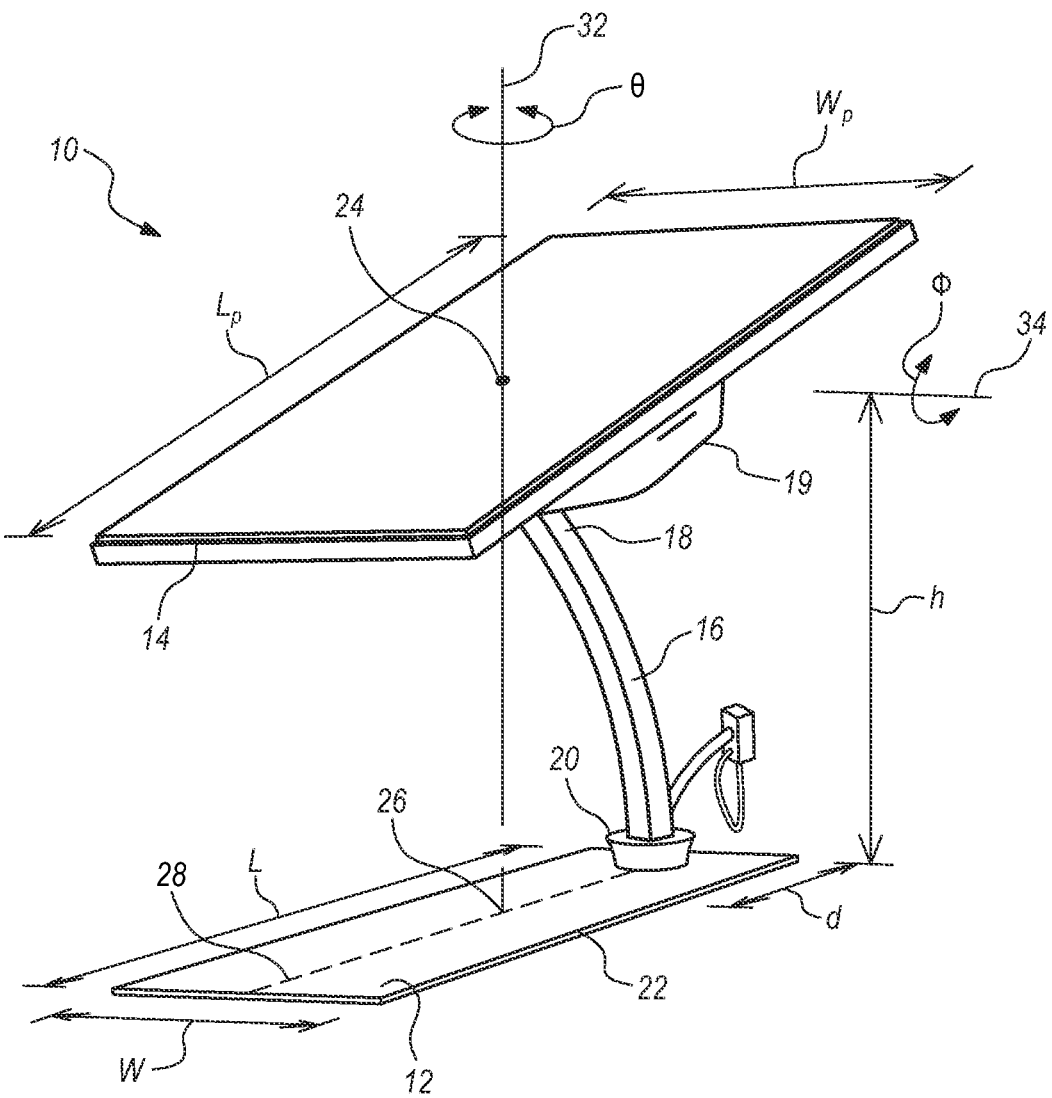
FIG. 1 is a perspective view of a portable charging station for electric vehicles showing a base plate for supporting a solar array.

Referring initially to FIG. 1 an electric vehicle charging station is shown and is generally designated 10. As shown, the charging station 10 for a vehicle (not shown) includes a base plate 12, a solar array 14 and a column 16. In combination, the upper end 18 of the column 16 is affixed to the solar array 14 with a component compartment 19 located therebetween and the lower end 20 of the column 16 is affixed near the periphery 22 of the base plate 12. Held within the component compartment 19 is a storage battery which, for purposes of the present invention, allows dispensing of electricity from the storage battery upon demand.

Dimensionally, the upper end 18 of the column 16 is affixed to support the solar array 14 at the center 24 of the solar array 14. Further, in an initial configuration for the charging station 10 shown in FIG. 1, the center 24 of the solar array 14 is positioned at a height h above the center 26 of the base plate 12 and a horizontal reference line 28 on the base plate 12. Further, FIG. 1 shows that the base plate 12 is generally rectangular with a length L and a width W. FIG. 1 also shows that the solar array 14 is rectangular and has a width Wp and a length Lp. It is to be appreciated that W and L of the base plate 12 are not necessarily equal to Wp and Lp of the solar array 14.

Figure 2:
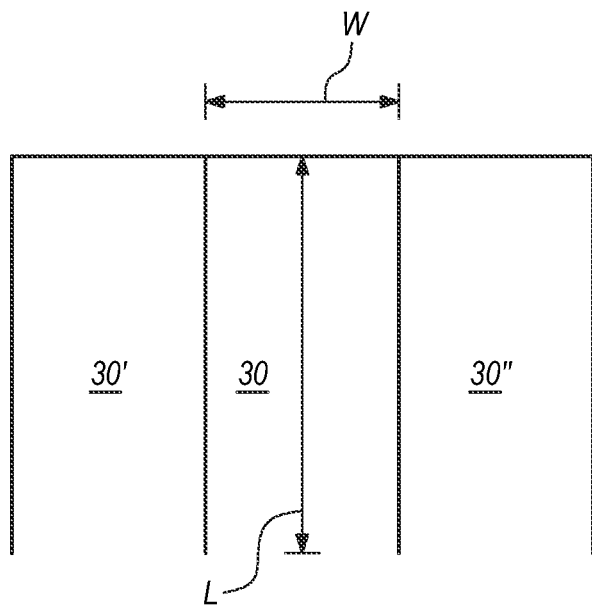
FIG. 2 is a top plan view of a parking lot showing the dimensions of parking spaces that are subject to enforcement by local ordinances or regulations.
Figure 3:
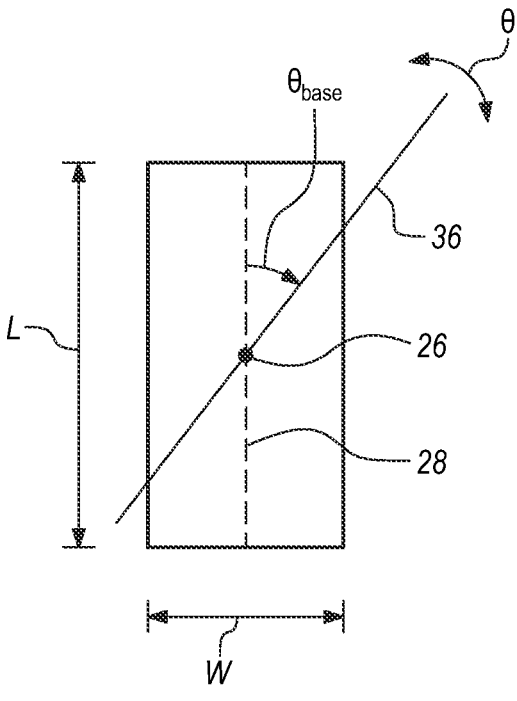
FIG. 3 is a top plan view of a base plate orientation established relative to a base angle $\theta$ base installation of a charging station.

As appreciated with reference to FIG. 2, the dimensions noted above are important insofar as they relate to the jurisdictional space requirements for a parking space 30 in a parking lot where the charging station 10 is to be situated. There are also additional concerns for objects (i.e. vehicles and obstacles) that may be occupying the adjacent parking spaces 30' and 30" and/or drive/access aisles. Specifically, to comply with jurisdictional requirements, the width W and length L of the base plate 12 must be equal to or less than the width W and the length L of the parking space 30.

Operationally, in accordance with a preprogrammed protocol, it is necessary that the solar array 14 reorient through an azimuthal angle θ, around a vertical axis 32 that passes through the center 24 of the solar array 14. It is also necessary that the solar array 14 reorient through an elevation angle, around a horizontal axis 34 that also passes through the center 24 of the solar array 14. More specifically, according to the preprogrammed protocol, the solar array 14 will move every day during daylight hours in a manner that will cause sunlight to always be incident normal to the surface of the solar array 14.

As intended for the present invention, by midday, the solar array 14 will have moved to a midpoint approximately halfway through its daily duty cycle. Despite the fact that a parking space 30 will typically not be perfectly aligned in a North/South direction, the tracking of the solar array can still be accomplished using the tracking system disclosed and claimed in U.S. Pat. No. 8,648,551. Thus, the solar array 14 can be established with any orientation regardless of the orientation of the parking space 30.

Figure 4:
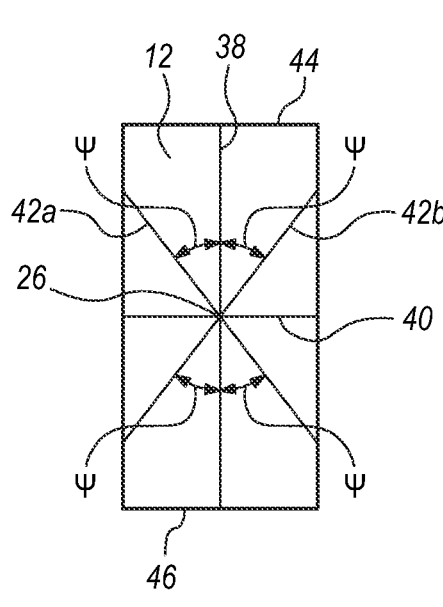
FIG. 4 is a top plan view of a base plate in accordance with the present invention, showing optional reinforcing structures by dashed lines.

Referring now to FIG. 4, it will be appreciated that an arrangement of reinforcing bars can be incorporated with the base plate 12 by means well known in the art to provide stability for the charging station 10 during an operation of the solar array 14. As shown, the arrangement includes a central reinforcing bar 38 that extends through the center 26 of the base plate 12, and a lateral reinforcing bar 40 that also extends through the center 26 of the base plate 12. Preferably, the central reinforcing bar 38 and the lateral reinforcing bar 40 are perpendicular to each other, and they are generally oriented on the base plate 12 as shown.

Additionally, the arrangement of reinforcing bars may include a pair of angled reinforcing bars 42a and 42b which respectively extend from the center 26 of the base plate 12 toward the end 44 of the base plate 12 on opposite sides of the horizontal reference line 28 at a respective angle ±ψ from the horizontal reference line 28. And further, wherein each angled reinforcing bar 42a,b respectively extends from the center 26 of the base plate 12 toward the end 46 of the base plate 12 on opposite sides of the horizontal reference line 28 at a respective angle ±ψ from the horizontal reference line 28.

While the particular Portable Electric Vehicle (EV) Charging Station Configured for Regulatory Parking Compliance as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

DETAILED DESCRIPTION OF THE DRAWINGS

At Referring initially to FIG. 1 an electric vehicle charging station is shown and is generally designated 10. As shown, the charging station 10 for a vehicle (not shown) includes a base plate 12, a solar array 14 and a column 16. In combination, the upper end 18 of the column 16 is affixed to the solar array 14 with a component compartment 19 located therebetween and the lower end 20 of the column 16 is affixed near the periphery 22 of the base plate 12. Held within the component compartment 19 is a storage battery which, for purposes of the present invention, allows dispensing of electricity from the storage battery upon demand.

Dimensionally, the upper end 18 of the column 16 is affixed to support the solar array 14 at the center 24 of the solar array 14. Further, in an initial configuration for the charging station 10 shown in FIG. 1, the center 24 of the solar array 14 is positioned at a height h above the center 26 of the base plate 12 and a horizontal reference line 28 on the base plate 12. Further, FIG. 1 shows that the base plate 12 is generally rectangular with a length L and a width W. FIG. 1 also shows that the solar array 14 is rectangular and has a width Wp and a length Lp. It is to be appreciated that W and L of the base plate 12 are not necessarily equal to Wp and Lp of the solar array 14.

As appreciated with reference to FIG. 2, the dimensions noted above are important insofar as they relate to the jurisdictional space requirements for a parking space 30 in a parking lot where the charging station 10 is to be situated. There are also additional concerns for objects (i.e. vehicles and obstacles) that may be occupying the adjacent parking spaces 30' and 30" and/or drive/access aisles. Specifically, to comply with jurisdictional requirements, the width W and length L of the base plate 12 must be equal to or less than the width W and the length L of the parking space 30.

Operationally, in accordance with a preprogrammed protocol, it is necessary that the solar array 14 reorient through an azimuthal angle θ, around a vertical axis 32 that passes through the center 24 of the solar array 14. It is also necessary that the solar array 14 reorient through an elevation angle ¢, around a horizontal axis 34 that also passes through the center 24 of the solar array 14. More specifically, according to the preprogrammed protocol, the solar array 14 will move every day during daylight hours in a manner that will cause sunlight to always be incident normal to the surface of the solar array 14.

As intended for the present invention, by midday, the solar array 14 will have moved to a midpoint approximately halfway through its daily duty cycle. Despite the fact that a parking space 30 will typically not be perfectly aligned in a North/South direction, the tracking of the solar array can still be accomplished using the tracking system disclosed and claimed in U.S. Pat. No. 8,648,551. Thus, the solar array 14 can be established with any orientation regardless of the orientation of the parking space 30.

Referring now to FIG. 4, it will be appreciated that an arrangement of reinforcing bars can be incorporated with the base plate 12 by means well known in the art to provide stability for the charging station 10 during an operation of the solar array 14. As shown, the arrangement includes a central reinforcing bar 38 that extends through the center 26 of the base plate 12, and a lateral reinforcing bar 40 that also extends through the center 26 of the base plate 12. Preferably, the central reinforcing bar 38 and the lateral reinforcing bar 40 are perpendicular to each other, and they are generally oriented on the base plate 12 as shown.

Additionally, the arrangement of reinforcing bars may include a pair of angled reinforcing bars 42a and 42b which respectively extend from the center 26 of the base plate 12 toward the end 44 of the base plate 12 on opposite sides of the horizontal reference line 28 at a respective angle ±ψ from the horizontal reference line 28. And further, wherein each angled reinforcing bar 42a,b respectively extends from the center 26 of the base plate 12 toward the end 46 of the base plate 12 on opposite sides of the horizontal reference line 28 at a respective angle ±ψ from the horizontal reference line 28.

Figure 5A:
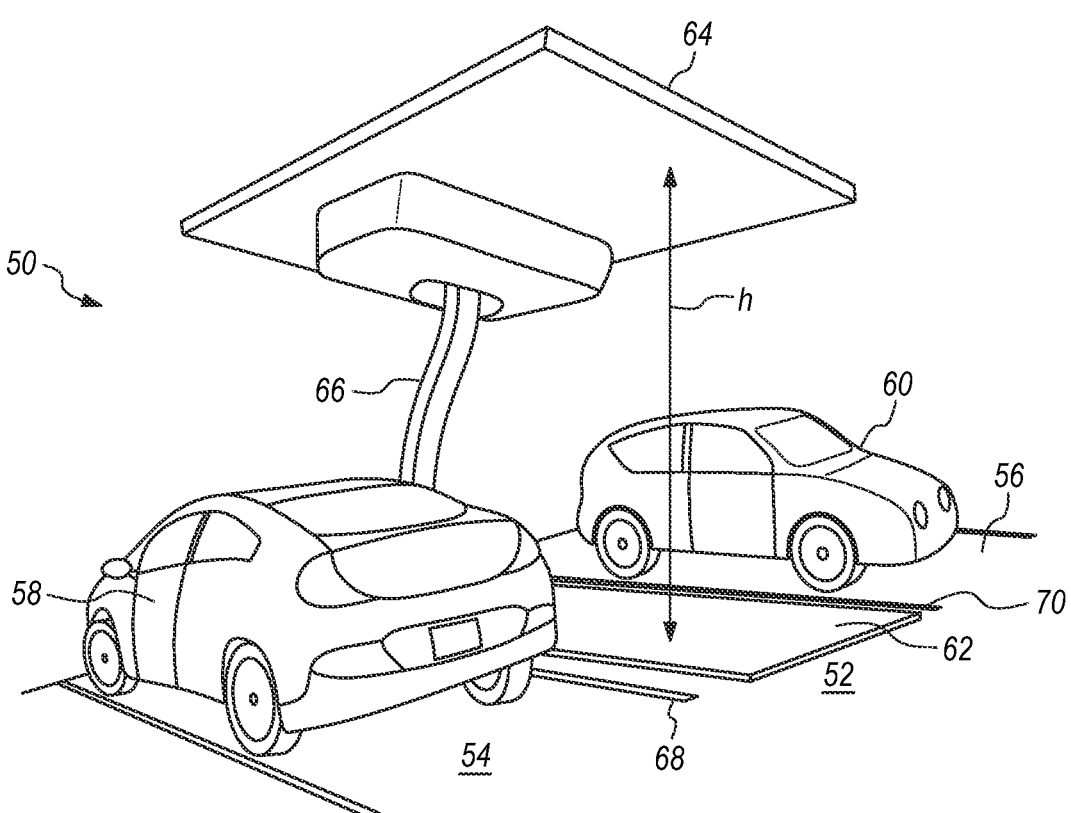
FIG. 5A is a perspective view of a portable electric charging station in accordance with the present invention that is dimensioned to accommodate an electric vehicle for recharging while maintaining the parking lot parking capacity with out diminishing the availability of parking spaces in the parking lot.

Referring to FIG. 5A an electric charging station in accordance with the present invention is shown and is generally designated 50. As shown, the electric charging station 50 is erected at a parking space 52 which is located between parking spaces 54 and 56. Further FIG. 5A shows a vehicle 58 parked in the parking space 54 and a vehicle 60 parked in the parking space 56. Thus, the electric charging station 50 must be dimensioned to accommodate vehicles parked in the parking space 52 while not diminishing the parking capacity of the parking lot where a plurality of vehicles may be parked.

In FIG. 5A the electric charging station 50 is shown to include a base plate 62 which is dimensioned to be placed within the parking space 52 without diminishing the availability of other parking spaces, such as the parking spaces 54 and 56. The electric charging station 50 is also shown to include a solar panel 64 which is connected with the base plate 62 by a column 66. As intended for the present invention the solar panel 64 collects renewable energy, i.e. sunlight, for use in recharging electric vehicles. For this purpose it is necessary that the solar panel 64 be suspended above the parking space 52 at a height "h" that is sufficient to accommodate a vehicle in the parking space 52. Further, it is to be noted that the base plate 62 has been dimensioned to fit between the parking lines 68 and 70 which define the parking space 52. Thus, the electric charging station 50 is effectively erected at the parking space 52 without interfering with or inhibiting vehicles 58 and 60 that may be respectively parked in the adjacent parking spaces 54 and 56.

Figure 5B:
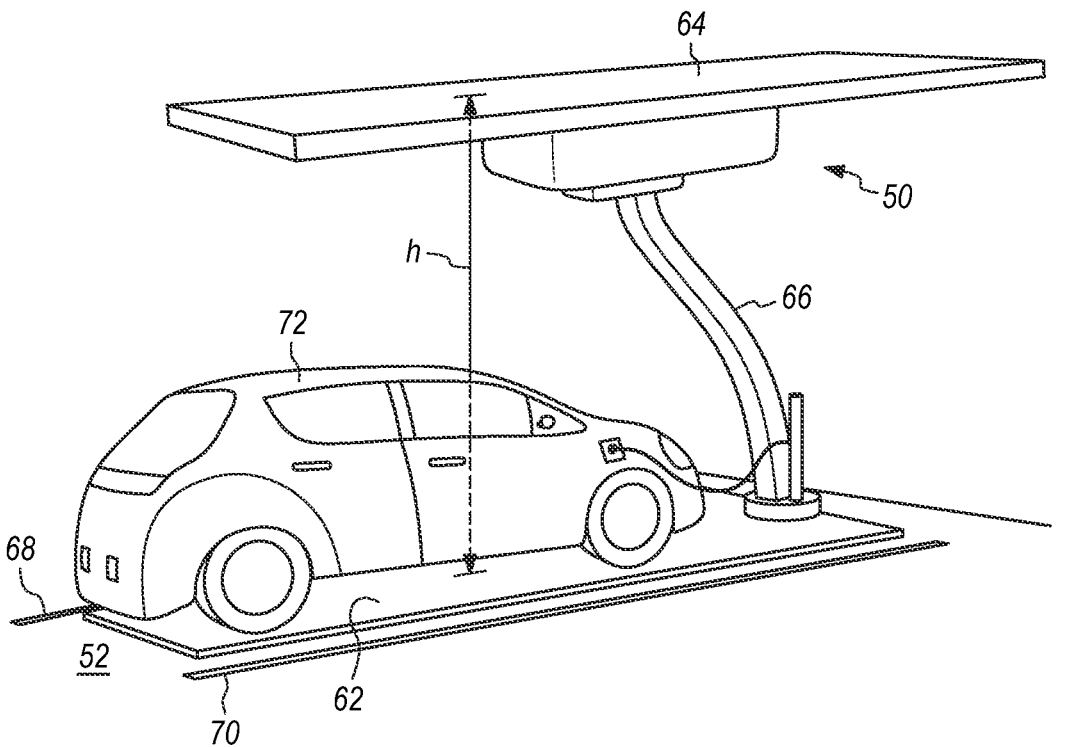
FIG. 5B is a view of the electric charging station shown in FIG. 5A while an electric vehicle is being recharged at the parking space.

In FIG. 5B an electric vehicle 72 is shown parked on the base plate 62 of the electric charging station 50 where it is being electrically recharged. For this recharging operation, an electricity transfer post 74 is provided at the charging station 50 which can be connected directly to the electric vehicle 72. In detail, the electricity transfer post 74 is electrically connected directly with the solar panel 64 to receive and store electricity as it is generated by the solar panel 64. The stored electricity is than available to be dispensed on demand to the electric vehicle 72.

While the particular Portable Electric Vehicle (EV) Charging Station Configured for Regulatory Parking Compliance as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

The invention claimed is:

1. A portable station for charging an electric vehicle which comprises:

a base plate having a width and length each dimensioned to fit between, and not extend into a drive aisle beyond, parking lines defining a parking space in a parking lot, whereby the parking space and all adjacent parking spaces remain fully available for receiving vehicles;

a column extending from the base plate and having an upper end and a lower end, wherein the lower end is affixed to the base plate;

a solar array connected to the upper end of the column to position the solar array at a height above the base plate to accommodate the electric vehicle on the base plate and within the parking space to electrically charge the electric vehicle;

a component compartment disposed at the upper end of the column, the component compartment including a storage battery connected to the solar array and a control unit connected to the battery and the solar array; and a charger for the electric vehicle, the charger disposed on or near the lower end of the column, the charger connected to the battery and the control unit, whereby the control unit is configured to dispense electricity from the storage battery to the charger upon the charger being connected to the electric vehicle; wherein the portable station is self-contained having no electrical connection to a local grid, and no construction connection to the parking space.

2. The portable station of claim 1, wherein no battery is positioned below the component compartment.

3. The portable station of claim 2, wherein an upper surface of the base plate is planar and receives the electric vehicle.

4. The portable station of claim 1, wherein the base plate is set within the parking space without any installation requirement and/or construction activity at the parking space.

5. The portable station of claim 1, wherein the base plate provides all ballast, structural support, and stability in the parking space for the portable station.

6. The portable station of claim 1, further comprising:

a tracking mechanism connected to the solar array; and a motorized unit mounted at the upper end of the column, wherein the motorized unit is electrically connected to the tracking mechanism for reorienting the solar array in accordance with a preprogrammed protocol.

7. The portable station of claim 6, wherein the preprogrammed protocol reorients the solar array to maintain the solar array in an orientation wherein sunlight incident on the solar array is optimized.

* * * * *